United States Patent [19]
Hedrick et al.

[11] 3,843,591
[45] *Oct. 22, 1974

[54] REINFORCED POLYAMIDE COMPOSITIONS

[75] Inventors: Ross M. Hedrick, Creve Coeur; William R. Richard, Jr., St. Louis, both of Mo.

[73] Assignee: Monsanto Company, St. Louis, Mo.

[ * ] Notice: The portion of the term of this patent subsequent to Dec. 31, 1985, has been disclaimed.

[22] Filed: Apr. 12, 1973

[21] Appl. No.: 350,578

Related U.S. Application Data

[63] Continuation-in-part of Ser. No. 260,000, June 5, 1972, , which is a continuation of Ser. No. 888,047, Dec. 24; 1969, abandoned, which is a continuation-in-part of Ser. Nos. 806,331, Dec. 30, 1968, abandoned, and Ser. No. 806,332, Dec. 30, 1968, abandoned, and Ser. No. 806,333, Dec. 30, 1968, abandoned, each is a continuation-in-part of Ser. No. 560,247, June 24, 1966, Pat. No. 3,419,517, which is a continuation-in-part of Ser. No. 284,375, May 3, 1963, abandoned.

[52] U.S. Cl............................................ 260/37 N
[51] Int. Cl............................................ C08g 51/04
[58] Field of Search................................. 260/37 N

[56] References Cited
UNITED STATES PATENTS

| | | | |
|---|---|---|---|
| 2,748,099 | 4/1956 | Brunner | 260/37 |
| 2,852,485 | 9/1958 | Stott | 260/37 |
| 3,290,165 | 12/1966 | Iannicelli | 106/308 |
| 3,386,943 | 6/1968 | Hedricks | 260/37 |
| 3,390,120 | 6/1968 | Iannicelli | 260/37 |
| 3,419,517 | 12/1968 | Hedricks | 260/37 |

Primary Examiner—Morris Liebman
Assistant Examiner—Richard Zaitlen
Attorney, Agent, or Firm—Thomas B. Leslie; Robert E. Hortenberger; John D. Upham

[57] ABSTRACT

Condensation polyamide compositions reinforced with from about 2 to about 55 percent by volume small particle size crystalline filler and an organosilane coupling agent are described. The compositions have improved mechanical properties such as concurrent high modulus and high multiaxial impact strength. Also disclosed are processes for preparing the above compositions as well as articles of manufacture.

36 Claims, No Drawings

REINFORCED POLYAMIDE COMPOSITIONS

CROSS REFERENCE TO RELATED APPLICATIONS

The present case is a continuation-in-part of copending U.S. Pat. Application Ser. No. 260,000, filed June 5, 1972, which in turn is a continuation of U.S. Pat. Application Ser. No. 888,047, filed Dec. 24, 1969, now abandoned, which in turn is a continuation-in-part of earlier copending U.S. Pat. Applications Ser. No. 806,331, Ser. No. 806,332 and Ser. No. 806,333, all filed on Dec. 30, 1968, and now abandoned, all of which three applications are continuations-in-part of U.S. Pat. Application Ser. No. 560,247, filed June 24, 1966, now U.S. Pat. No. 3,419,517, which in turn is a continuation-in-part of U.S. Pat. Application Ser. No. 284,375, filed May 31, 1963, now abandoned.

BACKGROUND OF THE INVENTION

The present invention pertains to condensation polyamide compositions modified by the inclusion therein of particulate crystalline filler and an organosilane coupling agent. The invention also pertains to processes for preparing the above-described compositions.

It is well known that polyamides may be filled with inorganic fillers and other substances to form uniform compositions. Fillers of various sizes, shapes and amounts have been incorporated into polyamides for a variety of purposes, which include opacification and coloration, increase in abrasion resistance, modification of thermal expansion and conductivity, and cost-lowering dilution of the polymer phase by a cheaper material. The addition to a polyamide, however, of even very minor amounts of these fillers such as carbon black, titanium dioxide and clay, has often had a deleterious effect on the impact strength of the polyamide. And high filler loadings have adversely affected other physical and mechanical properties as well.

More recently, as disclosed in U.S. Pat. No. 3,419,517, hereby totally incorporated herein by reference, it has been possible through the use of coupling agents to improve some mechanical properties of polyamides by incorporating therein relatively large amounts of a variety of particulate inorganic materials. While the compositions of U.s. Pat. No. 3,419,517 can be compounded to exhibit a high modulus of elasticity, strength, and heat distortion temperature, it is always desirable to improve the performance level of any composition. In the case of the foregoing compositions, one area where improvement is particularly desirable is the area of multiaxial impact strength which is a modified, and often better, indication of "on the job" performance than the uniaxial impact strength measured by Izod impact.

It is also known that the impact strength of these and other reinforced polymer compositions may be increased by such methods as the incorporation of a plasticizer or retention of unpolymerized monomer in the polyamide phase. Or reinforced polyamide compositions with improved impact may be formulated by selecting for use polyamides which have high impact strengths themselves. However, the improvement in impact strength thus obtained for any given polyamide composition is inevitably obtained at the expense of a decrease in other important mechanical properties such as the modulus of elasticity. Because of this variable compounding capacity, it is possible to extend the useful range of application of these compositions by tailoring them to suit a particular use. For example, reinforced prior art polyamide compositions ranging from those for applications requiring moderate impact strength but not a high modulus of elasticity, to those for applications requiring high modulus but for which good impact strength is not necessary, may be formulated by the inclusion or exclusion of plasticizer or residual monomer, the increase or decrease in the amount of reinforcing agent, and the proper selection of the matrix polymer. It should be recognized, however, that although this ease of "tailoring" prior art compositions to the requirements of a particular application is a fortunate advantage, it is basically a property-balancing compromise indicating a need for higher performance materials with the cost and fabrication advantages of the prior art reinforced polymer compositions. In addition, most of the inorganic materials used in prior art compositions are overly abrasive in the usual resin processing equipment.

Simultaneous increases in modulus, tensile strength and impact strength over polyamide compositions containing equivalent amounts of inorganic material have been possible through the incorporation of fibrous glass materials into polyamide compositions. However, these increases are specifically associated with the axial direction of the fibers. And generally decreases, particularly with respect to impact strength, are noted in a direction lying in a plane normal to the fiber axis. Since fibrous material tends to align preferentially during forming, molding and other fabrication processes, the mechanical properties of these fiber-reinforced compositions are isotropically dependent upon this preferential alignment. This deficiency is particularly evident in multiaxial impact strength testing. In addition, the incorporation of even very minor amounts of fibrous materials greatly increases the apparent melt viscosity of a polyamide and thereby renders conventional forming, molding and fabrication techniques extremely difficult or inoperative.

Fillers such as titanium dioxide and carbon black have been homogeneously incorporated into polyamides in minor amounts to serve as nucleating agents to induce crystallization and increase molding speed. Such prior art nucleated induction of crystallization in polyamides, while providing a fast-molding nylon, unfortunately is limited in its usefulness because of the brittleness of the molded product.

In Applicants' copending parent application, U.S. Pat. Application Ser. No. 260,000, filed June 5, 1972, they have described parameters within which polylactams can be reinforced with organosilane coupler-treated fillers. They have now found that a related set of parameters apply to polyamides formed by condensation polymerization. It is therefore a principal purpose of this invention to provide anisotropic, particulate-reinforced condensation polyamide compositions with mechanical properties significantly improved by comparison to polyamide compositions of the prior art, and thus increase the range of applicability of reinforced polyamide compositions as engineering materials. Another purpose of this invention is to provide nucleated, fast-molding condensation polyamide compositions with improved mechanical properties which are easily fabricated into useful articles.

SUMMARY OF THE INVENTION

The instant invention relates to reinforced condensation polyamide compositions comprising a condensation polyamide having an intrinsic viscosity of at least about 1.0 and a $M_w/M_n$ ratio not greater than about 2.5, and from about 2 to about 55 volume percent based on the total composition of a particulate crystalline inorganic filler material having a Moh's hardness of at least about 4 and a particle size such that about 100 percent of the particles have a particle size of about 40 microns or less and at least about 95 percent by weight of the particles have a particle size of about 15 microns or less, said filler material having been treated with an organosilane coupling agent of the formula:

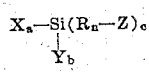

where X is a hydrolyzable group capable of reaction with a hydroxyl group, Y is a hydrogen or a monovalent hydrocarbon group, Z is primary or secondary amino, primary or secondary amido, or epoxy, R is a divalent hydrocarbon group having from 1 to about 20 carbon atoms, $a$ is equal to 1 or more, $c$ is equal to 1 or more, $n$ is equal to 0 or 1, and the sum of $a + b + c$ is 4.

These compositions are characterized by their superior impact strength, particulary with regard to multiaxial impact strength, over prior art polyamide compositions having equivalent moduli of elasticity. The improved multiaxial impact resistance of the compositions is valuable in heavy-duty applications not formerly within the performance range of polyamide compositions. For example, polyamide compositions of the instant invention are successful in some automobile parts applications formerly requiring zinc die-castings. The instant invention also relates to a process where the reinforced polyamide is molded into a finished shape at a temperature at or above the melt temperature of the polyamide. The polyamides useful herein comprise those polymers formed by the condensation polymerization of polycarboxylic acids with polyamines. The term "condensation polyamides" used throughout the specification and claims is intended as a generic term to cover the above-mentioned class of polymers. One of the most significant polymers of this class of condensation polyamides is polyhexamethylene adipamide (nylon 6,6). Other related polyamides include those formed from diamines such as propanediamine, hexamethylenediamine and octamethylenediamine and dicarboxylic acids such as adipic acid, pimelic acid, suberic acid, sebacic acid and dodecanedioic acid. Also included are copolymers or polyblends of polyamides. The copolymers or polyblends can consist of mixtures of the polyamides of this invention with other polyamides such as polyactams or with other compatible resin systems. The copolymers or polyblends of this invention are limited to those containing at least 50 percent by weight condensation polyamide. Most of the preferred compositions will contain at least 80 percent by weight condensation polyamide in the resin phase. Examples of resins which can be mixed with condensation polyamides to form a blend or copolymer include polylactams such as nylon 6, polypropylene, polyethylene, polyethylene imine, polystyrene, polyacrylonitrile, polybutadiene, acrylonitrile-containing rubbers, styrene-acrylonitrile copolymer and polyphenylene oxide.

The polyamides may be linear or crosslinked. The maximum amount of tolerable crosslinking in the polymer depends upon the proposed use of the finished composition. Moderate cross-linking produces compositions with high temperature resistance and somewhat diminished flexural strength and modulus. Suitable cross-linking agents are well known in the art and can be used here in the conventional manner. Two compounds which have been successfully used include polyethyleneimine and tetra-(3-aminopropoxymethyl) methane. In addition, crosslinking can be achieved through the coupler by condensation of silanol groups to form siloxane linkages, i.e.,

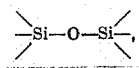

or by the inclusion of polymers such as polyisopropyl acrylamide or polymethyl methacrylate.

Polyamides useful in the practice of the instant invention have an intrinsic viscosity of at least about 1.0, more preferably at least about 1.1, even more preferably at least about 1.2, and even more preferably at least about 1.3. There is no theoretical upper limit on the intrinsic viscosity of a polyamide useful in the practice of this invention. However, considerations of ease of fabricating articles and general workability lead to the selection of polymers having an intrinsic viscosity not greater than about 2.4 particularly if the composition contains a large amount of reinforcing filler. If, on the other hand, highly filled compositions are not being employed, workable compositions capable of being fabricated into finished articles can contain as the polymeric matrix a polyamide matrix having an intrinsic viscosity as high as 3.0 or more.

Intrinsic viscosity is determined according to the following formula:

$$\text{Intrinsic Viscosity} = \sqrt{2/C} \times \sqrt{\eta\text{spec} - \ln \eta \text{ rel}}$$

where

C is the concentration of polymer in solvent, $\eta$ spec is $\eta$ rel $- 1$, and $\eta$ rel is viscosity of the solution/viscosity of the solvent. Solomon and Ciuta, *J. Appl. Polym. Sci.*, Vol. 6,686 (1962). Intrinsic viscosity is used as the limiting factor in describing polyamides useful in this invention because of the ease with which intrinsic viscosity can be measured and the unequivocal nature of the results obtained. Intrinsic viscosity is, however, merely a means of measuring a more fundamental property of the polyamide matrix, i.e., its molecular weight. But polymers in general, including polyamides, do not usually consist of polymeric molecules having uniform molecular weight. Rather they consist of a multitude of molecular species of polymer homologs covering a broad range of weights. The actual distribution of molecular weights of individual molecules depends upon a large variety of factors well known to one skilled in the art. In addition to the variables of the polymerization reaction, reactants, interchange reactions and thermal and mechanical degradation processes, blending of polyamides, or selective removal of particular fractions such as the low molecular weights, will also affect the molecular weight distribution. Since distributions are involved, it is both practical and customary to characterize the molecular size distribution of a given sample by some sort of average value. But since no single-valued variable can fully describe the various distributions that may be present in polymeric substances, the various averages of molecular weight each convey only incomplete resolution of the molecular composition of the polyamide. However, a particular physical property often depends upon a particular average molecular weight so that the determination of this value alone is sufficient for interpretation of that property. For example, the number average molecular weight which represents the total weight of a polymer sample divided by the number of moles of molecules is directly related to the colligative properties of a polymer sample (such as the osmotic pressure of dilute solutions of the sample) and is sensitive to changes in the low end of the molecular weight distribution. Similarly, the weight average molecular weight, which is directly related to such properties as the turbidity of a dilute solution of a polymer sample, is sensitive to large molecular species and relatively insensitive to the lower end of the molecular weight distribution. In the context of the instant invention, it has been fround that the viscosity average molecular weight ($M_v$) is related to the intrinsic viscosity of the polymer. Accordingly, the intrinsic viscosity can be used to distinguish the compositions of this invention from those of the prior art. The determination and meaning of these average molecular weight values are well known to those experienced in the art and may be reviewed in *Principles of Polymer Chemistry*, Chapters VII and and VIII, Cornell University Press, 1953, by P. J. Flory. As mentioned earlier, maximum benefits are attained in the instant invention by using polyamides having the intrinsic viscosity values set forth above. Generally speaking, it has been determined that polyamides useful in this invention have viscosity average molecular weights greater than about 27,000 grams per mole, preferably greater than about 30,000 grams per mole, and more preferably greater than about 35,000 grams per mole. There is no upper limit on the molecular weight of useful polyamides, and the crosslinked polymers useful herein may have extremely molecular weights. However, because of the high apparent melt viscosity of highly filled high molecular weight polyamide compositions, it is advantageous to use a polyamide with a viscosity average molecular weight of less than 100,000 grams per mole in the preparation of highly filled compositions intended for such purposes as injection molding. If, on the other hand, highly filled compositions are not necessary or desirable, the molecular weight of the polyamide can be 200,000 grams per mole, or even as high as 1,000,000 grams per mole or more. It is preferred that a theta solvent such as m-cresol, in which the polyamide has approximately the same statistical configuration as it does in a polymer melt, be used in determining the viscosity average molecular weight of the polyamide. Polyamides, which because of crosslinking or branching have a network structure or are of such high molecular weight that they are insoluble in solvents such as m-cresol, are nevertheless definitely within the scope of the instant invention.

In addition to a minimum molecular weight as expressed by intrinsic viscosity, it is also necessary that the polymer have a certain maximum molecular weight distribution as expressed by the ratio of the weight average molecular weight ($M_w$) to the number average molecular weight ($M_n$). Polymers included within the scope of this invention are limited to those having a maximum $M_w/M_n$ of 2.5, preferably a maximum of 2.2 and even more preferably a maximum of 2.0 . There is no minimum value for $M_w/M_n$ below which the advantages of this invention cannot be obtained. It has been ascertained, however, that $M_w/M_n$ ratios between about 1.8 and 2.1, more preferably between about 1.9 and 2.1, are characteristic of polyamides particularly suitable for use in the present invention.

Fillers useful in the present invention are crystalline, inorganic particles having a certain range of particle sizes and size distributions and having a Moh's hardness of at least four. Many of the fillers preferred for use in this invention have hardnesses between 5 and 7 approximately. Fillers having hardnesses greater than 7 can be used advantageously herein, but their frequently higher cost often makes them less desirable for general use. Use of a filler such as corundum, however, having a hardness of 9, can become desirable or even necessary for special applications.

Crystallinity is another important feature of the fillers of this invention. Although some crystalline forms of a given filler provide compositions with better mechanical properties than other compositions using a different crystalline form of filler, all crystalline fillers, as opposed to amorphous materials, are included within the scope of this invention.

In addition to being crystalline, it is also necessary that the filler particles be of such a size that 100 percent of the particles are about 40 microns or less and at least about 95 percent by weight of the particles have a particle size of 15 microns or less, preferably about 10 microns or less, and more preferably, about 5 microns or less. A preferred maximum particle size limitation is about 30 microns, and even more preferably about 20 microns. Another important characteristic of the fillers useful herein is the amount of filler having a particle size less than the maximum particle size limitation but greater than the smaller specified size. In some instances it is desirable that there be no filler particles greater than 15 microns, i.e., that 100 percent of the particles be about 15 microns or less, preferably about 10 microns or less. In most instances, fillers having 99 percent of their particles 15 microns or less are comparable to fillers where 100 percent of the particles are 15 microns or less. In other instances, a balance of considerations can make a filler having 100 percent of its particles 30 microns or less and about 96 or 97 percent of particles 15 microns or less the best choice. The particle size of a filler refers to the largest dimension of the filler particles, the shape of which may vary from being somewhat platelike to somewhat tubular or oblong. The term particulate as used in this disclosure refers to granular, platelike, and acicular particles having a length to diameter ratio ($l/d$) up to about 25 to 1. Platelike shapes are considered to be axially compressed particles with an $l/d$ ratio of less than 1. Preferably, the inorganic filler useful herein have an $l/d$ ratio up to about 20 to 1, and more preferably from about 1 to 15 up to about 15 to 1. In contrast, the term fibrous refers to particles whose l/d ratios are greater than 25 to 1, and usually are greater than 50 to 1.

Examples of suitable fillers useful in the practice of this invention include minerals such as alumina, silica, calcined kaolinite, feldspar, mullite, kyanite, wollastonite, hercynite, amosite and other metal silicates, phosphates, aluminates, aluminosilicates, sulfates, sulfides, carbides, etc.; metals such as aluminum, tin, iron, steel, magnesium, titanium, zirconium, vanadium, chromium, manganese, cobalt, copper, nickel and zinc; metal oxides such as oxides of calcium, strontium and barium, tin, lead, magnesium, titanium, zirconium, vanadium, chromium, manganese, iron, cobalt, copper, nickel and zinc; and other inorganic compounds such as boron carbide, calcium carbonate, silicon carbide and carbon black.

A preferred class of fillers particularly preferred for maximizing the advantageous combination of flexural rigidity (modulus) and impact strength are the aluminas, silicas, metal silicates, metal aluminates and aluminosilicates. Alumina and silica are referred to in the plural because of the different crystalline forms of each material and the different particle shapes and sizes which are available.

The principal form of alumina useful herein is $\alpha$-alumina (corundum). Known natural deposits of $\alpha$-alumina for mining are limited in extent, and most $\alpha$-alumina is prepared by heating the various hydrated aluminas to a temperature above about 1,000°C. to drive off water and convert them to the $\alpha$-crystalline form. For example, hydrated alumina ores such as bauxite and laterite may be calcined above 1,000°C to produce a crude $\alpha$-alumina useful herein. These ores contain not only various amounts of impurities such as silica and kaolin clay which are not deleterious to the usefulness of the calcined product, but also undesirable impurities such as iron oxides and hydroxides. Preferred are the more pure $\alpha$-aluminas obtained from the calcination of alumina minerals such as diaspore, gibbsite and boehmite. An especially preferred material is the alumina obtained from refining processes for aluminum production such as the Bayer process in which the alumina is dissolved from the ore and recovered as relatively pure hydrated alunima which is then calcined at temperatures above 1,000°C. to form $\alpha$-alumina. However, all forms of unhydrated $\alpha$-alumina, however prepared, are useful in this invention. Another useful alumina is $\gamma$-alumina such as that produced by heating the trihydrates or $\alpha$-monohydrate of alumina between about 900°C. and 1,000°C. Unhydrated $\beta$-alumina formed in the presence of minor amounts of an alkali is also useful.

Another preferred filler useful in the present invention is calcined kaolin clay. Calcined kaolin clay is a finely divided material which is primarily an alumina-silica refractory such as that produced by the calcination of kaolin clay. Kaolin clays are clays composed chiefly of kaolin minerals, quartz, feldspar and mica, but may contain small amounts of other mineral or organic materials. Kaolin minerals include kaolinite, nacrite, dicktite, livesite, halloysite, anauxite and allophane. Kaolinite, halloysite and livesite are preferred because of their favorable particle size and relative abundance while nacrite and dickite may occur naturally in particle sizes which require further subdivision before they are useful herein. Isomorphous substitution of cations in kaolin minerals is not extensive and is not of practical concern, but would be included within the operable limits of the instant invention. Natural residual kaolin clays useful herein, even after processing and refining, may contain various materials other than kaolin minerals. For example, useful commercial kaolinite clays may contain between 80 to 90 percent of kaolin mineral contaminated mainly with quartz, fine-grained micas or hydrous micas, and feldspar. Useful halloysite-bearing clays may contain considerable flint; and all of the useful kaolin clays may contain hydrated alumina minerals such as diaspore, boehmite and gibbsite. In addition to the residual kaolin clays, sedimentary kaolin clays, also known as ball clays, are particularly useful in the compositions of this invention because of their small particle size, which may average 0.5 micron or less. The sedimentary kaolin clays are generally less pure than the residual clays and are composed chiefly of a clay mineral, usually kaolinite or livesite, hydrous mica and quartz, and small quantities of primary mica, titania and some iron and magnesium-bearing minerals. In order to be useful in this invention, it is necessary that the kaolin clays be calcined at a temperature above about 400°C. Preferably, the kaolin clays are calcined at a temperature above 550°C for one-half hour or more, more preferably at a temperature between about 700°C and 1,000°C for about 2 hours or more. When the kaolin clays are calcined in this manner, water is driven off, organic material such as lignite is removed, and the crystallinity of the mineral components of the clay is reduced.

Still other preferred fillers are those forms of silica having a Moh's hardness of at least about 4. Excluded from the scope of this invention by the above limitation are the amorphous, hydrated forms of silica such as silica aerogels and other forms of precipitated silica, such as may be prepared chemically from a basic silicate such as sodium silicate. Quartz silicas, on the other hand, constitute a preferred class of fillers useful herein. Quartz silica exists in a number of different forms, including $\alpha$-quartz and $\beta$-quartz. The form of quartz known as $\alpha$-quartz is a particularly preferred form. In addition, other crystalline forms of silica, closely related to quartz, such as cristobalite and tridymite, are also useful herein. Commercially available silicas which can be used in the instant invention are sold under the tradenames Novacite, Neonovacite and Minusil. All the foregoing useful silicas have Moh's hardnesses exceeding 4, and usually exceeding 6.

Fillers within the scope of this invention are used with a polyamide and coupler in quantities of from about 2 percent to about 55 percent by volume, based on the total composition. The upper limit is determined by the maximum amount of the inorganic filler which can be incorporated into a polyamide while maintaining the improved properties of the compositions. At higher loadings in the range of 30 percent or more filler, there is difficulty in completely dispersing the filler in the polyamide, as well as difficulty in molding or processing such highly loaded materials because of their high melt viscosity. The lower limit of filler concentration is restricted insofar as is necessary to provide reinforced polyamide compositions with the exceptional improvement in mechanical properties achieved by the compositions of this invention. While filler loadings of 0.25 to 0.75 percent of materials such as carbon black are frequently used as nucleating agents to induce crystallization and modify spherulite size and formation, higher filler loading in the range of 2 percent or more, significantly increases the brittleness of such compositions. The compositions of this invention provide nucleated polyamides with a concentration of nucleating agent greater than about 2 percent based on the polyamide which do not show substantial impairment of their impact strength. Preferred compositions for use as fast molding nucleated polyamides contain from about 2 to about 10 percent by volume filler while preferred compositions for uses requiring a high modulus of elasticity contain from about 10 to about 50 percent by volume filler. Without regard to nucleation capability, one preferred range of filler loading is from about 2 to 20 or 25 percent, preferably from about 10 to about 20 or 25 percent, by volume filler. Another range of filler loading often used when mechanical properties are to be maximized is from about 25 to about 55 percent, preferably from about 30 to about 45 percent, by volume of the total composition.

In addition to the particulate inorganic filler, a small amount of fibrous material such as glass, cellulose, asbestos, metal and ceramic fibers can be incorporated into the compositions of the instant invention, particularly those containing less than about 25 percent by volume particulate filler, to provide additional, albeit isotropic, mechanical property improvement.

An essential material in the preparation of our reinforced polyamide compositions is the coupling agent which binds the inorganic filler to the polymer. While a very broad range of silane compounds has been previously used as coupling agents for reinforced thermoplastics, organosilane compounds useful in the preparation of these polyamide compositions having exceptional multiaxial impact strength are limited to those substituted silanes of the formula

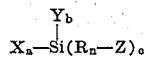

where X is a hydrolyzable group capable of reaction with a hydroxyl group, Y is a hydrogen or a monovalent hydrocarbon group, R is a divalent hydrocarbon group having from 1 to about 20 carbon atoms, Z is a primary or secondary amino, primary or secondary amido, or epoxy group, $a$ is an integer from 1 to 3, $b$ is an integer from 0 to 2, $c$ is an integer from 1 to 3, $n$ is 0 or 1 and the sum of $a + b + c$ equals 4. Preferably, $a$ is equal to 3, $b$ is equal to 0 and $c$ is equal to 1.

Examples of suitable X groups include halogen and hydroxy groups as well as alkoxy, cycloalkoxy, aryloxy, alkoxy-substituted alkoxy such as β-methoxyethoxy, alkoxycarbonyl, aryloxycarbonyl, alkyl carboxylate and aryl carboxylate groups, preferably having eight or less carbon atoms. Examples of Y groups in the above formula are hydrogen, methyl, ethyl, vinyl, isobutyl, phenyl and other hydrocarbyl groups, preferably having ten or less carbon atoms. The function of the Y group can be to modify the extent of the polymer-filler bonding or compatibility, to regulate viscosity of the monomer slurry or polymer mix or to modify the thermal stability of the coupler. The R group can be any divalent hydrocarbon group having up to about 20 carbon atoms and preferably from about 2 to about 18 carbon atoms; examples include ethylene, propylene, isobutenylene, decylene, undecylene, octadecylene, phenyl and toluyl groups. Usually the Z group is separated from the silicon atom by an R group having at least two carbon atoms in the linking chain. As the number of carbon atoms in the R group increases, the coupler can perform as a viscosity reducer. Further, the activity of Z group on the divalent hydrocarbon R group is often modified somewhat by the length of the divalent R group, thereby making the coupler perform more suitably under some processing conditions. Among the Z groups suitable for use herein, the primary amino and the epoxy groups are particularly preferred. Specific examples of coupling agents are γ-aminopropyl triethoxysilane
  $(C_2H_5O)_3SiC_3H_6NH_2$;
γ-aminopropyl trimethoxysilane
  $(CH_3O)_3SiC_3H_6NH_2$;
γ-aminopropyl phenyl dimethoxysilane

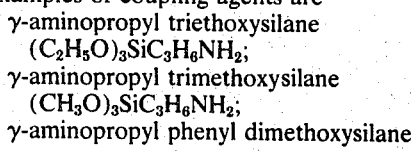

γ-glycidoxypropyl tripropoxysilane,

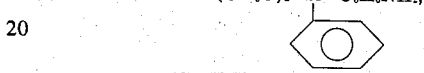

3,4 epoxycyclohexylethyl trimethoxysilane,
  $C_6H_7OC_2H_4Si(OCH_3)_3$;
γ-propionamido triethoxysilane,
  $NH_2COC_2H_4Si(OC_2H_5)_3$
N-trimethoxysilylpropyl-N(β-aminoethyl)amine,
  $(CH_3O)_3SiC_3H_6NHC_2H_4NH_2$; and
N-trimethoxysilylundecyl amine,
  $(CH_3O)_3SiC_{11}H_{22}NH_2$.

It has previously been theorized in U.S. Pat No. 3,419,517 that chemical bonds may be formed between polyamide and coupler, and between coupler and inorganic filler but this has not been conclusively established. Other theories suggest an intermolecular interaction between the polyamide and coupler made possible by mutual compatibility, and the reaction of the coupler with itself to form a crosslinked network around each filler particle. However, these mechanisms are possible for many organosilane couplers not useful in this invention. It is speculatively theorized that the limited class of couplers useful in this invention provides sufficient bonding or adhesion between the inorganic filler and polyamide to adequately transfer long duration forces (compressive tensile, shear, etc.) from the polyamide matrix to the filler phase, yet not such a rigid bond that it is incapable of elasticity or yielding to short term forces (such as impacts of various kinds). It is also theorized that the type of filler itself might beneficially affect the morphology of the composition at the polymer-filler interface. Whatever the mechanism of the interaction, to which we do not intend to be bound, those couplers which have the above mentioned functional groups can provide compositions with excellent multi-axial impact properties whereas couplers not containing such functional groups generally provide compositions with inferior impact properties.

Adhesion of polymer and coupler can be achieved under any conditions which permit thorough contact of the two components. One means has been to mix together coupler, filler and polyamide forming monomers and conduct a polymerization. Another means has been to mix thoroughly a coupler, filler and preformed polymer. Yet another means has been to mix monomer and coupler followed by filler. One preferred method has been to pretreat the filler with coupling agent and then add the resultant adduct to a preformed polyamide resin. Other techniques which provide the requisite contact of polymer and coupler can also be used. Reaction might occur by several mechanisms such as aminolysis. Aminolysis can occur by reaction of amino groups or by amide interchange with primary or secondary amido groups with the amide groups of the polymer. Another possible reaction, characterized as transamidation, involves the interchange between the amide groups of the coupler and the amide groups of the polymer. Finally, the reaction between an epoxy function on a coupler and the amide groups of the polymer can also take place. It should be noted in connection with the above comments on polyamide-functional group reaction that neither complete nor instantaneous reaction may be necessary. That is, if covalent bonding of polymer and coupler is responsible for the extraordinary improvement achieved by the practice of this invention, it is further theorized that only a fraction of the possible polymer-coupler bonds may provide as good or nearly as good properties in the finished composition as would a complete reaction.

A second consideration regarding the adhesion of polymer and filler is the coupler-filler interface. Filler and coupler can be joined by combining them in the absence or presence of solvent for the coupler, such as water, alcohol, dioxane, benzene, etc. Presumably, the hydrolyzable group of the coupler reacts with the surface of the crystalline filler, or with other hydrolyzable groups of other coupler molecules located at or near the surface of the filler, to form bonds between the coupler molecules and the particles of filler. Other theories can be advanced which deny the existence of true covalent bonds between inorganic filler and coupler. Regardless of any theoretical explanation advanced herein, to which we do not intend to be limited, the coupler is attached to the filler by contacting the two substances. The mixture is preferably but not necessarily subsequently dried. A bond between the filler and coupler is thus obtained. The reaction of filler and coupler can be carried out separately, and the filler-coupler adduct subsequently added to the monomer or preformed polymer, or the reaction may be carried out in the presence of the monomer or polymer and the whole mixture dried to remove volatile reaction products and solvents, if used. Preferably, heat in the range of 50° to 200°C or more is applied to a coupler-filler adduct to increase the extent of bonding.

The amount of coupler with which the filler is treated is usually relatively small, ranging from about 0.1 to about 5 percent by weight, preferably from about 0.25 to about 2 percent by weight, based on the weight of the filler.

As mentioned above, one method of preparing the reinforced polyamides of the instant invention comprises mixing together a polyamide, coupler and inorganic filler under conditions which provide thorough contact of the filler-coupler adduct with the polyamide. For example, a suitable filler with a maximum particle size of about 30 microns, coupler and high molecular weight polyamide resin can be placed in a container and agitated to achieve some sort of crude dispersion.

The dispersion is then processed through an extruder and chopped into granules which then may be injection molded. Other processing techniques for compounding preformed polymers with other materials may also be used to prepare compositions of this invention such as mixing by means of a KO Kneader or combining the compounding and manufacturing operations in a reciprocating screw-ram type injection molding machine. Another processing technique comprises milling the components followed by compression molding or calendering. Oxidative degradation associated with the milling operation becomes a problem, however, unless care is taken to exclude oxygen during the milling operation. In carrying out these compounding operations, the filler may either be pretreated with the coupler or treated with coupler in the presence of the polyamide. Other processing techniques are also applicable to this invention.

Direct blending of the preformed polyamide with a coupler and filler as described above has certain disadvantages, particularly at relatively high loadings, e.g., 10 volume percent or more. Specifically, thorough dispersion of filler in the polyamide phase becomes more difficult to achieve at the higher levels of loadings. And poor dispersion of filler in polymer produces compositions with unsatisfactory mechanical properties. Because the apparent viscosity of the reinforced polyamides of the invention increases with increasing filler content, higher energy consumption, higher temperatures and higher shear conditions are necessary to effect complete dispersion of the more highly loaded compositions. Unfortunately, the higher temperature and shear necessary increases the probability of polyamide degradation and depolymerization, and the attendant molecular weight lowering may affect the properties of the finished composition. Should the intrinsic viscosity of the polyamide matrix be degraded to a value much below about 1.0 with a concomitant increase in the $M_w/M_n$ above about 2.5, the high multiaxial impact strength of the composition will be impaired.

One preferred method, therefore, for preparing compositions of this invention is by polymerizing polyamide-forming monomers in the presence of coupler-treated filler, the dispersion of said filler being effected in the less viscous monomer rather than in the preformed polymer. Compositions having a branched or crosslinked polyamide phase can also be readily prepared in this manner, with the polymerization taking place in a mold having the shape of the desired article. Thus, some of these compositions may be prepared by the condensation polymerization of a polyamine and polycarboxylic acid in the presence of coupler and filler to form a polyamide with an intrinsic viscosity of at least about 1.0. Preferably the amine and carboxylic acid are both difunctional. Examples of amines include tetramethylene diamine, pentamethylene diamine, hexamethylene diamine, octamethylene diamine, dodecamethylene diamine and bis(t-amino cyclohexyl)methane. Suitable dicarboxylic acids include adipic, pimelic, suberic, azelaic, sebaic, dodecanedioic and terephthalic acids. Amine salts of the acids are formed by reacting equivalent amounts of the amine and acid in a suitable solvent for the salt such as water or alcohol and recovering the salt. By way of example, the salt is dissolved in water to form a 50 to 75 percent aqueous solution. A filler pretreated with a silane coupler is added to the solution. The reactor is then sealed and heated to about 200° to 240°C to develop a pressure of 250 psi. After an hour or two, the temperature is raised to 270° to 300°C as steam is bled off to maintain the pressure at 250 psi. The pressure is then gradually reduced to atmospheric pressure and additional water removed. The polymer-coupler-filler mixture can be extruded, chopped and molded to for compositions having excellent mechanical properties. Other methods of preparing reinforced polyamides by condensation polymerization can also be employed using an inert solvent for the salt such as phenol, cresol or xylenol with a nonsolvent such as the hydrocarbons or chlorinated hydrocarbons optionally included.

If the polymer is prepared in the presence of the filler and coupler, reactants, reaction conditions, catalysts and initiators must be selected and controlled so that the finished product will contain a polyamide matrix with the requisite viscosity average molecular weight, molecular weight distribution and the exceptional properties of the compositions of this invention. One way in which this can be readily accomplished is by the preparation of compositions which have a crosslinked or branched polyamide phase. For example, to produce such compositions, the polyamide can be included in the reaction mixture with a coupler-treated filler and a crosslinking agent. It should be recognized that moderately or highly crosslinked polyamide compositions should be molded in their desired final shape since they are not thermoplastic materials in the sense that they can be remolded. Branched or lightly crosslinked polyamide compositions may be cast into some intermediate form such as pellets, and later reformed into other shapes, but molecular weight degradation, in the high shear and temperature conditions of reforming, may be extensive for these compositions.

Another advantageous method of preparing the compositions of this invention involves the precipitation of a high molecular weight polyamide from solution onto filler which has been treated with a coupling agent. For example, a slurry of a coupler-treated filler may be prepared in a solvent for polyamides. A high molecular weight polyamide is dissolved in this slurry at elevated temperatures, and the temperature then lowered until the polyamide crystallizes from solution onto the surface of the filler. Alternatively, the polymer may be dissolved in the solvent prior to the addition of the filler, and after the preparation of a slurry, the polymer may be precipitated from the solvent by pouring the slurry and dissolved polyamide into a nonsolvent compatible with the solvent. Preferred solvents are the theta solvents such as exemplified hereinabove, although other polyamide solvents may also be used. After drying, the polymer-coated filler thus obtained may be injection or compression molded into useful articles. This method is particularly advantageous for the preparation of very highly loaded compositions, some of which are not injection moldable, but which may be readily melt blended with an additional amount of a polyamide to form an injection moldable material, or which may be used alone as a molding powder which can be formed into a dense, hard material.

The reinforced polyamide compositions can be prepared in the form of powders, pellets, beads, sheets, strands or rods which can be comminuted to form powder or pellets, which can be subsequently molded into a desired shape. Molding operations which can be successfully used include injection molding, compression molding, extruding, thermoforming operations such as blow molding and vacuum forming, and in general molding processes where the polymer is heated to or above its melt temperature before or during the molding cycle.

The compositions of this invention are characterized by mechanical properties not previously obtainable in particulate-reinforced polyamides. Like some prior art compositions, those of this invention may be formulated for specific applications by preparing compositions which are lower in some property values to achieve a necessary improvement in others. But the range of combinations of mechanical properties which can be developed with compositions of this invention is considerably broader than that previously achieved by particulate reinforced polyamides. To be more specific, the compositions of this invention have a multiaxial impact strength, as measured by the falling ball impact test described hereinafter, of at least twice that achieved for prior art reinforced compositions having a polyamide resin matrix with an intrisic viscosity below and molecular weight distribution above the limits specified herein. Some of the preferred compositions of the invention have multiaxial impact strengths six or more times those of prior art compositions having the same flexural modulus and a lower molecular weight polyamide matrix. The six fold or more increase in multiaxial impact strength, shown by the preferred compositions of this invention over prior art compositions represents a significant improvement in polyamide compositions as practical engineering materials. For example, while prior art compositions having a flexural modulus of about a million may have a dry falling dart impact strength of less than 2 foot pounds as measured by the impact test described below, preferred compositions of this invention with a flexural modulus of about a million may have a dry falling dart impact strength of greater than 16 foot pounds. Other mechanical properties of these compositions, such as flexural strength and tensile strength are also excellent.

The invention will be more clearly understood from the detailed description of the following specific examples describing the preparation, testing and superior properties of some of the preferred compositions.

Unless otherwise noted, test specimens used in the following examples are injection molded from cylindrical pellets approximately one-tenth inch long and one-tenth inch in diameter which have been dried at about 80°C and about 10 mm. Hg in a vacuum oven for 16 hours or until the moisture level is less than 0.2 percent by weight of the polyamide phase. The pellets are molded into test specimens by a reciprocating screw injection molding machine in which the mold temperature is maintained at about 200°F by a circulating oil heat exchanger. The barrel temperatures in the machine are set at about 500°F. and test specimens are made with the machine operating automatically with a screw back pressure of about 200 psig, an injection pressure of about 1,200 psig, a mold cycle time of about one minute and an injection time of about 2 to 3 seconds.

The first 50 to 100 specimens of a composition are discarded and only those specimens made after the machine is equilibrated are tested. After molding, the specimens are either sealed in metal cans and tested within 1 hour or are dried at about 80°C and 10 mm.

Hg in a vacuum oven for 16 hours immediately prior to testing. Since polyamides tend to absorb water, which because of its plasticizing effect increases impact strength, testing of polyamide compositions must be carried out on specimens having equivalent amounts of moisture in the polyamide phase in order to have comparative results which are valid. This is most easily accomplished by equilibrating samples with an easily reproducible environment, such as those of either boiling water or a vacuum oven. Equilibration of the test specimens with the essentially anhydrous environment of a vacuum oven is chosen for these examples because the high performance compositions of this invention are excessively difficult to break with the test equipment described below if the polyamide phase is plasticized with even moderate amounts of moisture.

Flexural strength and modulus of elasticity values are measured as described in ASTM D-790 and Izod notched impact strength is measured as described in ASTM D-256, Procedure A.

Falling dart impact strength is determined according to ASTM D-3029-72 using a 2¼ inch diameter ring instead of the ring size specified in the test procedure. Gardner impact strength is measured according to the procedure set forth in Cohen et al., Materials Research and Standards, Volume 9, No. 5, p. 21 to 24 (1969). Both of the falling dart and the Gardner impact strengths are used herein because of their capability to an impact strength as contrasted to an impact strength such as an Izod impact strength, which is a uniaxial measurement.

EXAMPLE 1

An uncalcined kaolin clay having an average particle size of about 0.5 microns (APS-100, a product of Minerals and Chemicals Philipp Corporation) is calcined at various temperatures over a range of from 350°C to 1,000°C. The calcination is carried out by heating 130 grams of ASP-100, spread uniformly in an 8 inches evaporating dish, in a furnace at the desired temperature for 4 hours, exclusive of heat up and cooling time.

Compositions containing 50 percent by weight of the above clay calcined at various temperatures, a nylon 66 with an intrinsic viscosity of 2.0, and 1 percent by weight based on the weight of the calcined kaolin of γ-aminopropyl triethoxysilane, are prepared by melt blending in an extruder. Another composition is prepared in the same manner, except that it contains 50 percent by weight of the uncalcined ASP-100 instead of the calcined material.

A composition containing ASP-100 calcined at 350°C shows little or no mechanical property improvement over the composition containing the uncalcined ASP-100. Starting with compositions containing clay calcined at a temperature of about 400°C, the compositions show significant improvement in flexural strength, tensile strength and multiaxial impact strength with increasing calcination temperatures up to about 800°C. For compositions containing clay calcined at temperatures from about 800°C. to 1,000°C, the mechanical property levels are about equal to the high levels achieved with a calcining temperature of about 800°C.

It is believed that the "decomposition" (loss of chemically bound water and loss of crystallinity) of kaolin clays starts at about 400°C. Thus, the ASP-100 which was calcined at 350°C shows the same X-ray diffraction pattern as the uncalcined ASP-100. ASP-100 heated at 600°C exhibits less crystallinity with lines at $d$ spacings of 3.53 Angstroms and 1.89 Angstroms, while the material heated at 800°C has little crystallinity with only one weak line at a d spacing of 353 Angstroms.

Multiaxial impact strength data for several of these 50 percent by weight kaolin composites is as follows:

| ASP-100 Calcination Temp. (degrees Centigrade) | Multiaxial Impact Strength (foot pounds) |
|---|---|
| 350 | less than 2 |
| 600 | greater than 12 |
| 800 | greater than 12 |
| 1000 | greater than 12 |

EXAMPLES 2 to 6

A commercially available calcined kaolin clay (Whitex) having a maximum particle size of about 15 microns and an average particle size of about 2 microns is mixed with 1 percent by weight of γ-aminopropyl triethoxy-silane. The mixture is heated to 100° to 150°C and then cooled.

To the above treated filler a number of nylon 6, 6 polymers having different molecular weights are added to produce mixtures containing 60 percent by weight nylon and 40 percent filler. The mixtures are each compounded by placing them in an extruder heated to a temperature between 540° and 580°F. necessary to heat the polymer-filler stock to 560°F. The extruded stock is chopped into small pellets which are introduced into a one ounce Arburg injection molding machine. The three zones of the molding machine are heated to 480°F, 500°F. The mold is heated to 200°F. The cycle time is 1 minute.

Table 1 below reports the physical characteristics of the polymers used and the mechanical properties of the polymeric compositions formed from the designated polymers.

Table 1

Nylon 6, 6 Compositions with 40% Coupler-Treated Calcined Kaolin Filler

| Ex. No. | Intrin. Viscosity | $M_w/M_n$ | Mol. Wt. | Falling Dart Impact | Tensile Str., psi | % Elong. at Break | Tensile Mod. × $10^{-5}$, psi |
|---|---|---|---|---|---|---|---|
| 2 | 1.01 | <2.1 | 27,800 | 16 | 13,690 | 7.6% | 9.37 |
| 3 | 1.22* | do. | 31,700 | 16 | 14,000 | 6.0 | 9.4 |
| 4 | 1.26 | do. | 33,100 | 24 | | | |
| 5 | 1.33 | do. | 35,400 | 35 | | | |
| 6 | 1.53 | do. | 42,000 | 44 | | | |

*values reported for Example 3 are the average for several compositions

EXAMPLES 7 and 8

Nylon 6,6 is blended with nylon 6 to produce a polymer blend containing 6 percent nylon 6. The polymer blend is then compounded with coupler-treated calcined kaolin clay and molded using the same conditions described for Examples 2 to 6 to produce polymeric compositions containing 40 percent by weight filler. Properties of the compositions are reported in Table 2 below.

EXAMPLES 9 and 10

The procedure used to prepare the compositions of Examples 7 and 8 is followed exactly except that the polymer blend is formulated to contain 12 percent nylon 6. Properties of the compositions are reported in Table 2 below.

Table 2

Nylon 6/66 Compositions with 40% Coupler-Treated Calcined Kaolin Filler

| Ex. No. | Intrin. Viscosity | $M_w/M_n$ | Mol. Wt. | Falling Dart Impact | Tensile Str., psi | % Elong, at Break | Tensile Mod. $\times 10^{-5}$, psi |
|---|---|---|---|---|---|---|---|
| 7 | 1.21 | <2.1 | 31,400 | 17 | 14,280 | 9.8% | 9.02 |
| 8 | 1.34 | do. | 35,800 | 30 | 13,990 | 12.2 | 10.1 |
| 9 | 1.24 | do. | 32,400 | 22 | 13,950 | 8.6 | 10.2 |
| 10 | 1.34 | do. | 35,800 | 38 | 14,220 | 10.7 | 9.18 |

The data set forth in Tables 1 and 2 shows that good impact strengths, as measured by the falling dart impact test, are obtained in reinforced polyamide compositions where the polymer has an intrinsic viscosity as low as 1.01. When the intrinsic viscosity of the polyamide is about 1.3 or higher, the impact strength is improved even more to such an extent that it is approximately double that of compositions having a polyamide of 1.0 intrinsic viscosity. The polyamide blends, shown in Examples 7 to 10 demonstrate approximately the same impact strength characteristics as the compositions containing only nylon 6, 6 as the sole polymeric constituent.

EXAMPLE 11

A reinforced nylon 6,6 composition containing 40 percent by weight coupler-treated calcined kaolin clay is prepared according to the procedure described for Examples 2 to 6.

The same nylon 6,6 starting material used to prepare the above composition is run through an extruder at an elevated temperaturre of 620° to 630°F. The extrusion at the elevated temperature causes the intrinsic viscosity of the polymer to be reduced to 0.92 from its original value of 1.12. Properties of the two compositions are reported in Table 3 below. The substantial drop in impact strength for the composition containing the lower molecular weight nylon demonstrates the need to keep the intrinsic viscosity of the polyamide component of the reinforced composition at or above about 1.0 to attain good impact strengths.

EXAMPLE 12

A reinforced polyamide composition containing 32 percent coupler-treated filler was prepared exactly like the compositions of Examples 9 and 10 except for the lower level of filler loading and except for the molding temperatures of 530°F for each of the three zones in the molding machine and a nozzle temperature of 530°F and a stock temperature of 545°F.

An identical composition was prepared except that the material was molded at the higher molding machine temperatures of 580°F, 580°F and 560°F for the three zones, and a nozzle temperature of 580°F and a stock temperature of 585°F.

A third composition, identical to the above two, was prepared except that the material was molded at the even higher molding machine temperatures of 630°F, 630°F and 530°F for the three zones, a nozzle temperature of 600°F and a stock temperature of 635°F.

The effect of the higher molding temperatures upon polymer molecular weight and upon the impact strength of the finished compositions is reported in Table 3 below. The data shows that molecular weight reduction of the polyamide component in the reinforced composition to a level above 1.0 results in a lowering of the impact strength of the composition, but that the impact strength is still adequate and acceptable. A further lowering of the polymer molecular weight to a level below 1.0 intrinsic viscosity completely destroys the impact strength of the composition.

Table 3

Effect of Compounding and Molding Temperatures Upon Impact Strengths

| Ex. No. | Intrin. Viscosity | $M_w/M_n$ | Mol. Wt. | Gardner Impact | Compounding Temp., °F | Molding Temp., °F |
|---|---|---|---|---|---|---|
| 11a | 1.12 | <2.1 | 28,200 | 36 | 560 | 480–500–520 |
| 11b | 0.92 |  | 22,400 | 7 | 620+ | 480–500–520 |
| 12a | 1.16 | <2.1 | 29,500 | 87 | 560 | 530–530–530–530–545 |
| 12b | 1.11 |  | 28,200 | 60 | 560 | 580–580–560–580–585 |
| 12c | 0.88 |  | 20,800 | * | 560 | 630–630–530–600–635 |

* too brittle to measure

What is claimed is:

1. A reinforced polyamide composition comprising:
   a. a polyamide matrix formed by the condensation polymerization of a polycarboxylic acid and a polyamide having an intrinsic viscosity of at least about 1.0 and a maximum $M_w/M_n$ value of about 2.5,
   b. from about 2 to about 55 percent by volume of the total composition of a particulate crystalline inorganic filler material having a Moh's hardness of at least about 4 and particle size such that about 100 percent of the particles have a particle size of about 40 microns or less and at least about 95 percent by weight of the particles have a particle size of about 15 microns or less, said filler material having been treated with an organosilane coupling agent of the formula:

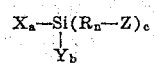

where X is a hydrolyzable group capable of reaction with a hydroxyl group, Y is a hydrogen or a monovalent hydrocarbon group, Z is a primary or secondary amino, primary or secondary amido or epoxy group, R is a divalent hydrocarbon group having from 1 to about 20 carbon atoms, $a$ is equal to 1 or more, $c$ is equal to 1 or more, $n$ is 0 or 1, and the sum of $a + b + c$ is equal to 4.

2. A composition according to claim 1 wherein said polyamide matrix is a copolymer containing at least 50 percent by weight condensation polyamide.

3. A composition according to claim 1 wherein said polyamide matrix is a polyblend containing at least 50 percent by weight condensation polyamide.

4. A composition according to claim 1 wherein said polyamide matrix is a condensation product of a dicarboxylic acid and a diamine.

5. A composition according to claim 1 wherein said polyamide matrix has an intrinsic viscosity of at least about 1.2.

6. A composition according to claim 1 wherein said polyamide matrix has an intrinsic viscosity of at least about 1.3.

7. A composition according to claim 1 wherein said polyamide matrix has a maximum $M_w/M_n$ ratio of about 2.2.

8. A composition according to claim 1 wherein said polyamide matrix has a $M_w/M_n$ ratio from about 1.8 to about 2.1.

9. A composition according to claim 1 wherein said filler has a maximum particle size of about 30 microns or less.

10. A composition according to claim 1 wherein said filler has an average particle size of about 10 microns or less.

11. A composition according to claim 1 wherein said filler is present in an amount from about 2 to about 25 percent by volume of the total composition.

12. A composition according to claim 1 wherein said filler is present in an amount from about 10 to about 25 percent by volume of the total composition.

13. A composition according to claim 1 wherein X is a halogen or alkoxy group, Z is an amino group, R is an alkylene group having from 2 to about 18 carbon atoms, $a$ is 3, $b$ is zero and $c$ is 1.

14. A composition according to claim 1 wherein said polyamide matrix is a crosslinked polyamide insoluble in m-cresol.

15. A composition according to claim 1 wherein said organosilane coupling agent is used in quantities of from about 0.1 to about 4 percent by weight, based on the weight of said filler.

16. A reinforced polyamide composition comprising:
a. a polyamide matrix formed by the condensation polymerization of polycarboxylic acid and a polyamine having an intrinsic viscosity of at least about 1.2 and a maximum $M_w/M_n$ ratio of about 2.2,
b. from about 2 to about 55 percent by volume based on the total composition of a crystalline inorganic filler wherein about 100 percent of the particles have a particle size of about 30 microns or less and about 95 percent by weight of the particles have a particle size of about 10 microns or less, said filler material having been treated with an organosilane coupling agent of the formula

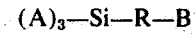

where A is a halogen or an alkoxy group, R is an alkylene group having from 2 to about 18 carbon atoms, and B is a primary or secondary amino group.

17. A composition according to claim 16 wherein said condensation polyamide matrix is a copolymer containing at least 90 percent by weight polyamide.

18. A composition according to claim 16 wherein said condensation polyamide matrix is a polyblend containing at least 90 percent by weight polyamide.

19. A composition according to claim 16 wherein said condensation polyamide matrix is a condensation product of a dicarboxylic acid and a diamine.

20. A composition according to claim 16 wherein said condensation polyamide matrix is nylon 6,6.

21. A composition according to claim 16 wherein said condensation polyamide matrix is a crosslinked polyamide insoluble in m-cresol.

22. A composition according to claim 16 wherein said filler is used in quantities of from about 10 to about 25 percent by volume of the total composition.

23. A composition according to claim 16 wherein said filler is used in quantities of from about 2 to about 10 percent by volume of the total composition.

24. A composition according to claim 16 wherein said filler has an average particle size of less than about 5 microns.

25. A composition according to claim 16 wherein said organosliane coupling agent is a γ-aminopropyl trialkoxysilane where the alkoxy groups have up to eight carbon atoms.

26. A composition according to claim 16 wherein the multiaxial impact strength is greater than 10 foot pounds.

27. A composition according to claim 16 wherein said polyamide matrix is nylon 6,6, said filler has an average particle size of less than about 5 microns, and said organosilane coupling agent is γ-aminopropyl trialkoxysilane where the alkoxy groups have up to eight carbon atoms, said organosilane coupling agent being used in quantities of from about 0.25 to about 2 percent by weight of said filler.

28. A process for preparing a reinforced condensation polyamide composition comprising
a. treating a particulate crystalline inorganic filler material having a Moh's hardness of at least about 4 and a particle size such that about 100 percent of the particles are about 40 microns or less and at least about 95 percent of the particles are 15 microns or less, with an organosilane coupling agent of the formula:

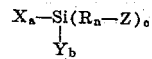

where X is a hydrolyzable group capable of reaction with a hydroxyl group, Y is a hydrogen or monovalent hydrocarbon group, Z is a primary or secondary amino, primary or secondary amido, or epoxy group, R is a divalent hydrocarbon group having from about one to about 20 carbon atoms, $a$ is equal to 1 or more, $n$ is equal to 0 or 1 and the sum of $a + b + c$ is equatl to 4, b. incorporating said treated filler material into a polyamide formed by the condensation polymerization of a polycarboxylic acid and a polyamine having an intrinsic viscosity of at least about 1.0 and a $M_w/M_n$ ratio of at least about 2.5 in an amount which will provide a composition having from about 2 to about 55 percent by volume filler, and c. subsequently forming the resultant composition at a temperature above the melt temperature of the polyamide in the composition to form a molded article.

29. A process according to claim 28 wherein said filler has an average particle size of about 10 microns or less.

30. A process according to claim 28 wherein said organosilane coupling agent is γ-aminopropyl trialkoxysilane where the alkoxy groups have up to 8 carbon atoms.

31. A process according to claim 28 wherein said filler has an average particle size of less than about 5 microns and wherein said organosilane coupling agent is γ-aminopropyl trialkoxy silane where the alkoxy groups have up to eight carbon atoms.

32. A process according to claim 28 wherein said polyamide is nylon 6,6 having an intrinsic viscosity of at least about 1.2.

33. A process according to claim 28 wherein said composition is injection molded.

34. A process according to claim 28 wherein said filler is incorporated into said polyamide by placing the filler in a polyamide solution and precipitating said polymide from said solution.

35. A reinforced polyamide article comprising a polyamide formed by the condensation polymerization of a polycarboxylic acid and a polyamide having an intrinsic viscosity of at least about 1.0 and a $M_w/M_n$ ratio of at least about 2.5, and from about 2 to about 55 percent by volume based on the total composition of a particulate crystalline inorganic filler material having a Moh's hardness of at least about 4 and a particle size such that about 100 percent of the filler particles are about 40 microns or less and at least about 95 percent of the filler particles are about 15 microns or less, said filler having been treated with an organosilane coupling agent of the formula:

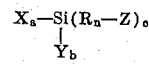

where X is a hydrolyzable group capable of reaction with a hydroxyl group, Y is a hydrogen or a monovalent hydrocarbon group, Z is a primary or secondary amino, primary or secondary amido, or epoxy group, R is a divalent hydrocarbon group having from one to about 20 carbon atoms, $a$ is equal to 1 or more, $c$ is equal to 1 or more, $n$ is equal to 0 or 1, and the sum of $a + b + c$ is equal to 4.

36. A composition according to claim 1 wherein said polyamide matrix is nylon 6,6.

* * * * *